United States Patent
Beeson et al.

(10) Patent No.: US 6,589,586 B2
(45) Date of Patent: Jul. 8, 2003

(54) COLD BEVERAGE CREAMER

(75) Inventors: Christine A. Beeson, Marysville, OH (US); Tersita B. Pascual, Marysville, OH (US)

(73) Assignee: Nestec S.A., Vevey (CH)

( * ) Notice: Subject to any disclaimer, the term of this patent is extended or adjusted under 35 U.S.C. 154(b) by 90 days.

(21) Appl. No.: 09/909,405

(22) Filed: Jul. 19, 2001

(65) Prior Publication Data

US 2001/0041211 A1 Nov. 15, 2001

Related U.S. Application Data

(63) Continuation of application No. 09/779,445, filed on Feb. 9, 2001, now abandoned, which is a continuation-in-part of application No. 08/697,226, filed on Aug. 21, 1996, now Pat. No. 6,287,616.

(51) Int. Cl.⁷ ............................. A23C 11/02; A23L 1/19
(52) U.S. Cl. ....................................... 426/570; 426/602
(58) Field of Search ............................. 426/565, 564, 426/569, 570, 588, 566, 285, 471, 453, 602

(56) References Cited

U.S. PATENT DOCUMENTS

| | | | |
|---|---|---|---|
| 2,835,586 A | 5/1958 | Peebles | 426/285 |
| 3,042,526 A | 7/1962 | Spiess | 426/285 |
| 3,100,909 A | 8/1963 | Schapiro | 426/285 |
| 3,116,150 A | 12/1963 | Baker | 426/285 |
| 3,120,438 A | 2/1964 | Mc Intire | 426/285 |
| 3,126,289 A | 3/1964 | Spilman | 426/285 |
| 3,164,473 A | 1/1965 | Shields | 426/285 |
| 3,238,045 A | 3/1966 | Damisch | 426/285 |
| 3,300,315 A | 1/1967 | Nava | 426/285 |
| 3,653,911 A | 4/1972 | Mancuso | 426/285 |
| 3,935,325 A | 1/1976 | Gilmore et al. | 426/613 |
| 3,958,031 A | 5/1976 | Fleck et al. | 426/579 |
| 4,012,533 A * | 3/1977 | Jonas | 426/565 |
| 4,021,582 A | 5/1977 | Hsu | 426/285 |
| 4,146,652 A * | 3/1979 | Kahn | 426/564 |
| 4,199,605 A * | 4/1980 | Kahn | 426/330.6 |
| 4,239,786 A | 12/1980 | Gilmore et al. | 426/601 |
| 4,242,364 A | 12/1980 | Buddemeyer | 426/658 |
| 4,244,977 A * | 1/1981 | Kahn | 426/330.2 |
| 4,318,932 A | 3/1982 | Ewing | 426/285 |
| 4,438,147 A * | 3/1984 | Hedrick | |
| 4,492,714 A | 1/1985 | Cooper et al. | 426/602 |
| 4,640,839 A | 2/1987 | Hsu | 426/285 |
| 4,737,369 A | 4/1988 | Asano et al. | 426/98 |
| 4,743,402 A | 5/1988 | Fick | 260/412.2 |
| 4,810,518 A | 3/1989 | Haisman | 426/579 |
| 5,260,077 A | 11/1993 | Carrick et al. | 426/73 |
| 5,284,674 A | 2/1994 | Fazio | 426/585 |
| 5,350,590 A | 9/1994 | McCarthy | 426/285 |
| 5,366,751 A | 11/1994 | Pordy | 426/585 |
| 5,400,972 A | 3/1995 | Maier et al. | 239/422 |
| 5,480,670 A | 1/1996 | Pordy | 426/585 |
| 5,554,400 A | 9/1996 | Stipp | 426/285 |
| 6,287,616 B1 * | 9/2001 | Beeson | 426/285 |

FOREIGN PATENT DOCUMENTS

| | | |
|---|---|---|
| CA | 895225 | 3/1972 |
| DE | 1 134 269 | 8/1962 |
| EP | 0 012 499 | 6/1980 |
| EP | 0 239 378 | 3/1987 |
| EP | 0 323 753 B1 | 7/1989 |
| EP | 0 780 055 | 6/1997 |
| FR | 74 29265 | 8/1975 |
| JP | 59-118043 | 7/1984 |
| JP | 2-207764 | 8/1990 |
| KR | 1139 | 2/1986 |
| WO | WO 96/08153 | 3/1996 |
| WO | WO 98/07329 | 2/1998 |

OTHER PUBLICATIONS

Severn 1979, Beuleys Industrial Oil and Fat Products, vol. 1, 4th ed. John Wiley & Sons, New York, p. 368–371.
WPI/Derwent, Japanese Abstract for JP54–113471, Sep. 5, 1979, "Fatty Product Easy Disperse Cold Water Produce Blend, Fatty Product Powder Fatty Acid Ester Cane Sugar", of Mitsubishi Chem Ind. Ltd.

* cited by examiner

*Primary Examiner*—Carolyn Paden
(74) *Attorney, Agent, or Firm*—Winston & Strawn

(57) ABSTRACT

A powdered creamer soluble in cold water down to the freezing point of a solution, which remains in solution during multiple freeze/thaw cycles. The creamer is made up of powdered or agglomerated creamer particles. The creamer particles are preferably made up of a sweetener, a water-dispersible or water-soluble protein and an edible oil having a melting point below 20° C.

25 Claims, No Drawings

COLD BEVERAGE CREAMER

CROSS-REFERENCE TO RELATED APPLICATIONS

This application is a continuation of application Ser. No. 09/779,445 filed Feb. 9, 2001, now abandoned, which is a continuation-in-part of application Ser. No. 08/697,226 filed Aug. 21, 1996, now U.S. Pat. No. 6,287,616.

FIELD OF THE INVENTION

This invention relates to a powdered creamer, which is cold water soluble down to freezing temperatures and which exhibits freeze/thaw stability through multiple freeze thaw cycles. It relates also to a beverage that includes such a creamer and to a method for the production of such a creamer.

BACKGROUND OF THE INVENTION

Powdered non-dairy creamers are well known and are widely used, particularly as coffee or tea creamers. Typically these creamers contain about 35 to 50% by weight of fat, about 25 to 40% by weight of a sugar-based sweetener, about 3 to 10% of a protein, and emulsifiers, stabilizers and buffers. The amount of the sweetener may increase to about 70% if sugars such as corn syrup are used. These powdered creamers are typically produced by subjecting a solution containing the components to spray-drying.

In these creamers, the fat used is usually a fat or oil which is bland or neutral in flavor and which remains stable over long periods. Coconut fat, in particular has been widely used. The protein used is usually a milk based protein such as casein; often in the form of sodium caseinate. Corn syrups are commonly used as the sugar-based sweetener.

When dissolved in hot water, these powdered creamers dissolve rapidly to whiten the beverage and provide a creamy mouthfeel. When added to cold water for example at 20° C. or below, however, they tend to be sparingly soluble, usually merely floating on the surface of the liquid, even if added with stirring. This makes these powdered creamers unsuitable for use in cold beverages. As there is an increasing demand for cold versions of traditionally warm milk-type beverages, this creates a need for a powdered creamer that will provide a milk-type drink when reconstituted in cold water and that can be stored at about freezing point until required to be dispensed.

Certain beverages, such as coffee-flavored granitas, are prepared and served in a semi-frozen ice slurry state. In such a beverage, there is at least a pseudo-equilibrium between continual melting of ice and simultaneous generation of additional ice. This continual freezing and thawing causes conventional creamers to break down, which is manifested by formation of white specks and a visible oil scum in the product. The white specks and the oil scum make the product visually unappealing. If the ice slurry beverage is to contain a creamer, the creamer must be capable of withstanding the continuous freezing and thawing which occurs while the product is on display and available for purchase.

Many conventional creamers must be initially dispersed into a hot water solution. Obviously, delay and expense are incurred when cooling this hot product down to the point where it becomes suitable for addition into a chilled ice slurry. Addition of a powdered creamer directly into an ice slurry product would greatly reduce preparation time.

An effort to produce a cold-water soluble creamer was addressed in published Japanese Patent Application No. 59-118,043. The application discloses hydrogenation of specified oils to raise the melting point in order to improve the stability of the product, followed by fractionation or ester exchange to remove unwanted by-products. This process was done in order to produce the oil comprising one ingredient of the creamer. It was also mentioned that olive oil and camellia oil could be used with no further processing required. The application teaches that the creamer resulting from such oils will easily disperse in water temperatures of 1–3° C.

Despite this, a creamer for an iced product possessing freeze/thaw stability properties and being dispersible in an ice slurry would provide a substantial competitive advantage over existing products. Thus, there remains a need for a cold beverage creamer that can exist with stability in the frozen state and undergo repeated freeze/thaw cycles without breaking down into its components or losing dispersibility. The present invention now satisfies this need.

SUMMARY OF THE INVENTION

The present invention relates to a powdered creamer which can remain soluble and/or stable in an environment which is undergoing continual freezing and thawing. This creamer is also readily dispersible in iced water slurries.

In one aspect, this invention provides a water-soluble creamer comprising a fat, a sweetener, protein and an emulsifier, in relative proportions effective to render the creamer capable, after dispersion in use, of remaining in stable dispersion in a dynamic freeze/thaw equilibrium. It was surprisingly found that a creamer comprising agglomerated particles that contain about 25–45% of oil, about 30–70% of sweetener, about 0.5–6.0% of protein and about 0.3–1.5% of an emulsifier, is capable of remaining in stable dispersion in a dynamic freeze/thaw equilibrium.

In another aspect, the invention provides a process for the preparation of a creamer, the process comprising providing a sweetener, a water-dispersible or water-soluble protein, an emulsifier, and an edible oil having a bland flavor and a melting point below about 20° C. and mixing these components together in relative proportions selected to render the creamer capable of remaining in stable dispersion in a dynamic freeze/thaw equilibrium.

The invention extends further to a method of preparing a cold creamy beverage, such as granita-type beverage, the method comprising the steps of providing a creamer mixture as described above and forming an aqueous solution containing this mixture. The method in a preferred form comprises providing an ice-slurry and mixing the creamer mixture into the slurry. The method comprises further holding the ice-slurry and creamer mixture in a state of at least a pseudo freeze/thaw equilibrium, in which state the mixture may be served for consumption.

In still another aspect, this invention provides an ice-slurry beverage product containing a water-soluble creamer, where the creamer comprises an oil and an emulsifier in relative proportions selected to render the creamer capable of remaining in stable dispersion in a dynamic freeze/thaw equilibrium.

In another aspect, this invention provides a cold-water soluble creamer for use in preparing an ice-slurry beverage product, the creamer comprising a sweetener, a water-dispersible or water-soluble protein, an emulsifier, and an edible oil having a bland flavor and a melting point below about 20° C., with the components being in relative proportions selected to render the creamer capable of remaining in stable dispersion in a dynamic freeze/thaw equilibrium.

DETAILED DESCRIPTION OF THE PREFERRED EMBODIMENTS

In the description that follows, the term "oil" refers to any edible vegetable oil or fat.

The term "stable dispersion" refers to the ability of the creamer formulation of the present invention to resist emulsion breakdown or separation in cold solutions such as those which are at 20° C. or lower temperatures.

The term "dynamic freeze/thaw environment" refers to an environment where an ice-slurry beverage is held under such conditions that ambient heat coming in causes some degree of melting of the ice particles, but where such melting is offset by additional cooling which acts to create additional ice crystals by freezing. This approach maintains at least a pseudo-equilibrium between the ice melted and the ice generated such that there is substantially no net accumulation or loss of ice in the system.

The term "freeze/thaw cycle" refers to the freezing of a liquid product containing the creamer formulation of the invention to a solid state, followed by subsequent thawing back to liquid solution form. A product capable of withstanding at least six such freeze/thaw cycles occurring immediately sequentially and, thereafter, in liquid form exhibiting no readily observable signs of separation or emulsion breakdown, is accepted to exhibit a high degree of freeze/thaw stability.

The creamer in powdered form is made up of agglomerated particles. These comprise at least protein, oil, emulsifiers and optionally, buffers. Preferably, they further contain sweeteners and flavors. The creamer may further include dairy-derived components, but may alternatively be free of dairy-derived components. The term "dairy-derived components" refers to product components such as proteins, emulsifiers, or fats being derived from bovine sources.

It has been found that when the oil is a low melting point oil and the creamer particles have a particle size diameter of about 170 microns and above, the resulting powdered creamer has excellent solubility in cold water. This powdered creamer is able to dissolve in water at a temperature of about 0° C. in no more than about twenty seconds. In contrast, conventional creamers need to be dissolved first in hot water, often at temperatures exceeding 65° C., before being cooled to a desired cold temperature. In the present invention, the ability of the creamer particles to dissolve immediately into cold water provides a great advantage, as it reduces reconstitution steps and thus cost and time.

A formulation comprising about 25–45% of oil, about 30–70% of sweetener, about 0.5–6.0% of protein, and about 0.3–1.5% of specified emulsifiers provides a creamer capable of remaining in stable dispersion in a dynamic freeze/thaw equilibrium. A particularly preferred formulation comprises about 35% oil, about 56.1% sweetener, about 2.7% protein and about 0.5% emulsifier, with buffers and residual moisture making up the rest of the product to 100%w/w. This creamer was formulated to withstand the continuous freeze-thaw environment of a chilled beverage dispenser such as a Bunn-o-matic CDS-2, operating at temperatures of about −3° C.

The edible oil is preferably present in an amount of about 25% to about 45% by weight of the powdered creamer; more preferably about 33% to about 36% by weight. The oil is typically one having a bland flavor, and it may be selected from an unhydrogenated to lightly hydrogenated oil, an oil composed of a blend of triglycerides and vegetable oil, an oil with high levels of mono-unsaturates such that the fatty acid moieties in the triglyceride comprise at least about 70% by weight of oleic acid and less than about 20% by weight of linoleic acid, or mixtures thereof, such that the melting point of the oil or oil mixture is less than about 20° C., preferably less than 10° C.

The edible oil may be at least partially hydrogenated to provide a melting point of less than 20° C., in order to provide maximum oxidative stability, where stability refers to avoidance of flavor off notes which characterize oxidized oils. Such hydrogenated oils are described in Japanese Patent Application 59-118,043.

Also, the edible oil may be comprised of medium chain triglycerides blended with vegetable oil as described in Japan application 2-207764, such that the melting point is less than about 20° C.

The edible oil may also be an oil with high levels of mono-unsaturates; for example a vegetable oil in which the fatty acid moieties in the triglyceride comprise at least about 70% by weight of oleic acid and less than about 20% by weight of linoleic acid. A suitable example of such an edible oil is the sunflower oil described in U.S. Pat. No. 4,743,402; the disclosure of which is incorporated herein by reference. Such a sunflower oil is also available from SVO Specialty Products Inc. of Eastlake, Ohio 44095, USA under the trade mark TRISUN EXTRA. This oil contains 85% oleic acid, has an Iodine Value (Wijis) of about 75 to 85, a Mettler Drop Point of 0° C., an AOM Stability of about 60 hours and a smoke point of about 238° C.

Another edible oil which may be used is the soybean oil commercially available under the trade mark DURKEE 500 from Loders Croklaan of Lisle, Ill., USA. Although perfectly functional, the soybean oil is less preferred in many applications since it may impart a slight "beany" taste to certain beverages.

Canola oil, hydrogenated to a melting point of 18–19° C., is the most preferred example of an oil for use in the present invention.

If desired or required, the edible oil may contain an effective amount of an acdeptable antioxidant; for example about 100 ppm to about 3000 ppm of tocopherol. Other suitable lipophilic antioxidants may also be used.

The creamer particles may include an emulsifier, preferably in an amount of about 0.5% to about 1.5% by weight of the powdered creamer. The emulsifier may be selected from monoglycerides, distilled monoglycerides, diglycerides, glycerol monostearates, sorbitol monostearates, esters or carbocyclic acids with mono- and di-glycerides, monosodium phosphate derivatives of mono- and di-glycerides, lecithin, diacetyl tartaric acid esters of mono-diglycerides, sorbitan esters, diacetyl tartaric acid esters of mono-diglycerides ("data esters"), diacetyl tartaric acid esters of di-glycerides, succinylated mono-and di-glycerides, acetylated mono- and di-glycerides, hydroxylated lecithin, propylene glycol mono- and di-esters of fatty acids, polyglycerol esters of fatty acids, lactylic esters of fatty acids, and mixtures thereof. Non-fat milk solids may also be used as an emulsifier. The emulsifier is preferably a mixture of distilled monoglycerides and diacetyl tartaric acid esters of mono-diglycerides. Another preferred emulsifier is a blend containing 60% diacetyl tartaric acid ester of monoglycerides and 40% distilled monoglyceridea.

Particularly preferred are distilled monoglycerides (for example those commercially available under the trade name of DIMODAN and obtainable from Danisco Products, Inc. of Kansas, USA) and diacetyl tartaric acid esters of mono-diglycerides (for example those commercially available under the trade name of PANODAN and obtainable from Danisco Products, Inc.) as well as succinylated monoglycerides, SMG, from Quest (esters of mondiglycerides are commonly known as data esters). The sweetener used in the creamer particles may be any suitable food grade sweetener, for example those conventionally used in the production of powdered creamers. Examples of suitable sweeteners are sugars such as corn syrup, sucrose, dextrose, fructose, maltodextrin, and the like, and mixtures of these sugars. Corn syrup is particularly suitable (especially dried corn syrup solids) since corn syrup adds bulk to the powdered creamer without imparting excessive sweetness. Maltodextrin, either alone or in combination with other sugars, may also be used; particularly is a product having less sweetness is desired. In any event, the particular sweetener or combination of sweeteners selected is not critical; the primary determining factors being for its selection being the desired taste, sweetness and bulk in the product. The amount of sweetener used will vary depending upon the sweetener, the desired level of sweetness and the strength of the sweetener, but generally this amount will be in the range of about 30 to about 70% by weight of the powdered creamer.

The sweetener may also contain artificial sweeteners such as saccharin, cyclamates, acetosulfame, L-aspartyl based sweetners such as aspartame, and mixtures of these. If an artificial sweetener is used, it is suitably combined with bulking agents such as maltodextrins and polydextrose. In this case, the total amount of sweetener and bulking agent is usually in the range of about 40 to about 70% by weight, with the artificial sweetener itself usually being present in an amount of less than 1% by weight.

The protein may be selected from any suitable waterdispersible or soluble protein; for example those normally used in powdered creamers. Examples of such proteins are soy protein, non-fat milk solids, whey solids, casein salts such as sodium and calcium caseinate, rice protein, wheat protein, oat protein, and the like. Mixtures of the various proteins may also be used. Sodium caseinate is most commonly used. The protein is preferably present in an amount from about 0.5 up to about 6% by weight. If the protein source is not pure protein, a greater amount of the protein source may be required to obtain the desired protein level.

The creamer particles may also contain suitable buffers, flavoring agents, coloring agents, flowing agents, antioxidants, and the like as is conventional in such products. A typical buffer system is, for example, dipotassium phosphate and sodium citrate. A suitable flowing agent is sodium silica aluminate.

The creamer particles may be dried by a conventional spray drying process. For example, an aqueous solution may be prepared by dissolving in water any buffers and salt forming agents that are used. Usually the water is hot; for example at a temperature of about 70 C. to about 90 C. Then the protein is dissolved or dispersed in the aqueous solution. A mixture of the edible oil and the emulsifiers is then added to the aqueous solution; followed by the sweetener. The resulting mixture is then mixed until all components have dissolved or dispersed.

Usually the mixture is then pasteurized and homogenized. The homogenized emulsion, at concentrations ranging from about 25% to 75% solids, and preferably about 55 to 62% solids, is then pumped to a spray tower and spray-dried at a temperature of less than about 97 C. When determining solids concentration, the oil or fat is considered to be a solid, even where it is in liquid form. The creamer particles obtained preferably have a moisture content of about 2% to about 4% by weight.

A surface emulsifier may then be sprayed on the creamer particles at this point, if desired. The surface emulsifier may be any suitable food grade emulsifier; for example, lecithin or a mixture of lecithin and medium chain triglycerides as described in Korean patent publication 86-121. Although not essential, the surface emulsifiers are found to improve the wettability of the powdered creamer. The surface emulsifiers may be sprayed on the creamer particles using any suitable spraying technique.

The creamer particles are then agglomerated. Agglomeration is a well-known technique that can be performed either in a spray-drying tower, in a separate agglomeration tower, or using other conventional agglomeration techniques. Any suitable agglomeration procedure may be used; for example, using the procedure described in U.S. Pat. No. 5,400,972, the disclosure of which is incorporated herein by reference thereto. Conveniently, steam or water is used as the agglomeration agent. Agglomerated particles leaving the tower that are of a size below a certain selected size may be returned to the tower. The agglomerated form of the powdered creamer should contain particles having a diameter of about 170 microns or greater in an amount of at least 80% by volume. The agglomerated particles form the powdered creamer.

Instead of spraying the surface emulsifier on the creamer particles prior to agglomeration as described above, it is also possible to spray the surface emulsifier on the particles during or after agglomeration.

The powdered creamer is especially suitable in a granita application where the product is a slurry of beverage component and ice. In such a product environment, there is continual melting of existing ice crystals and formation of new ice crystals. This continual freezing and thawing environment breaks down conventional beverages; such breakdown is evidenced by white flecks scattered throughout the product and the appearance of an oil scum on the surface of the product. By using the instant invention, such breakdown is avoided. The product can withstand multiple (i.e., from at least two to six, ten, twelve or even more) freeze/thaw cycles with no visible deterioration, no white flecks, and no oil scum.

The powdered creamer may also be used as a creaming or whitening agent in a variety of beverages such as coffee and tea, in particular iced coffee and iced tea. It may also be used as a component of soluble beverage powders which are intended to be dissolved in cold water or milk; for example malted drink powders, chocolate drink powders, milkshake powders, fruit flavored powders, and the like It will be appreciated that various modifications may be made to the described embodiments without departing from the invention. For example, it is possible to inject gas into the pasteurized and homogenized creamer emulsion prior to spray drying. The gas may be, for example, air, nitrogen or carbon dioxide and may be injected at a pressure of about 100 kPa to about 2.5 MPa above the pressure of the emulsion. In this way, the creamer particles obtained after spray drying will contain entrapped gas. Upon reconstitution, the entrapped gas will be released, causing the beverage to foam. This variation will be suitable for soluble beverage powders intended to produce milk shake beverages and foaming coffee mixes, for example.

Instead of entrapping gas into the creamer particles, it is also possible to add foaming agents to the soluble beverage powder. A suitable foaming agent is a mixture of a food grade acidulant and an alkali metal carbonate or bicarbonate. For example, a mixture of citric acid and potassium bicarbonate.

It is further desirable to include thickening agents in the soluble beverage powder to provide a beverage of a thicker or heavier consistency. Suitable thickening agents are well known in the art and any of the conventional agents can be used in this invention as well.

EXAMPLES

The most preferred embodiments of the invention will now be illustrated further by way of the following examples:

Example 1

The procedure below was performed on the basis of 100 kg of creamer mixture fed to a spray dryer described below at a concentration of 60% solids by weight and 40% water by weight, where included fat is accounted to be a solid. 40 kg water at 68 C. is added into a mixing tank. A mixture of 0.99 kg dipotassium phosphate and 0.49 kg tribasic sodium citrate as buffer is added to the mixing tank and agitated for one mintue. Then, 1.67 kg sodium caseinate is added and mixed for 2 minutes.

In a separate tank, 21.65 kg canola oil which has previously been hydrogenated to a melting point of 18 to 19 C. and has been pre-melted, is combined with 0.12 kg distilled monoglycerides and 0.19 kg Diacetyl Tartaric Acid Ester of Monoglycerides. This blend is then mixed at 21 C, after which the oil/emulsifier mixture is then added to the aqueous solution in the mixing tank under stirring, and the entire mass is mixed further. 34.70 kg corn syrup, in powder form, is added to the mixture. Maltodextrin 24 DE solids and 0.19 kg dairy flavor is added, plus conventional colorings or flavors. The entire mass is then mixed.

The mixture is then pasteurized and then homogenized in two stages at about 71 C; the first stage being at a pressure of 17.25 Mpa and the second stage at about 3.45 MPa.

The solution is then pumped to a spray tower and spray dried to provide a powder of creamer particles containing about 2% to about 3% by weight moisture.

The creamer particles are then fed to an agglomeration tower. The creamer particles are introduced into the tower through a two jet nozzle using air at a temperature of about 121 C. (250 F.). Steam at about 10 kPa (1.5 psi) is used as the agglomeration agent in the tower and the pressure in the chamber of the agglomeration tower is about 7 kPa (1 psi). The agglomerated power is then spray coated by spraying lecithin onto the powder. The agglomerated powder is used as the powdered creamer.

The creamer powder is added to an ice slurry beverage known as a granita. This product is circulated at 4 C. with continuous agitation. The creamer remains in solution, with no visible indication of flocculation, oil scum, or white flecks forming.

Example 2

A powdered creamer as described in Example 1 is added to a liquid coffee mix at 15 C. to make up 18% solids and the solution is thereafter chilled to −3 C. After holding and sampling over a three day period, no indication of flocculation, oil scum, or white flecks is exhibited in the product.

Example 3

The same formulation is used as described in Example 1, except that 12.37 kg unhydrogenated coconut oil and 9.28 kg MCT (Medium chain triglycerides) replace the 21.65 kg hydrogenated canola oil. The blend of MCT and unhydrogenated coconut oil is pre-melted and then combined with 0.12 kg Distilled Monoglycerides and 0.19 kg Diacetyl Tartaric Acid #Ester of Monoglycerides. This blend is then mixed at 21 C., after which the oil/emulsifier mixture is then added to the aqueous solution in the mixing tank while stirring, and the entire mass is mixed further.

Corn syrup addition and remaining processing steps are as described in Example 1.

The creamer is then added to an ice-slurry liquid beverage product being held at 0 C. with continuous cooling and moderate agitation. After 24 hours, no flocculation, oil scum, or white flecks are seen.

Example 4

The same formulation is used as described in Example 1, except that the sodium caseinate is reduced from 1.67 kg to 0.62 kg and corn syrup is reduced from 34.7 kg to 32.66 kg. All other additions and processing steps are as described in Example 1.

Additional protein is added via 5 kg nonfat dry milk solids.

The creamer is then added to an ice-slurry liquid beverage product being held at 0 C with continual cool and moderate agitation. After 24 hours, no flocculation, oil scum, or white flecks are seen.

It will be appreciated that various changes, modifications and variations to and of the preferred embodiments described above will be apparent to those skilled in the art. These may be made without departing from the scope and spirit of the invention and without diminishing its attendant advantages. It is therefore intended that all such changes, modifications and variations be covered by the appended claims.

What is claimed is:

1. A water soluble creamer comprising an edible oil, sweetener, protein, and an emulsifier, provided in proportions effective to render the creamer capable, after dispersion in a beverage component, of remaining in a stable dispersion in a dynamic freeze/thaw equilibrium that includes multiple freeze/thaw cycles.

2. A creamer according to claim 1, where the proportions enable the creamer in use to withstand at least six freeze/thaw cycles.

3. A creamer according to claim 2, where the proportions enable the creamer in use to withstand at least ten freeze/thaw cycles.

4. A creamer according to claim 1, which is free of intentionally added dairy-derived components.

5. A creamer according to claim 1, where the edible oil has a melting temperature of below 20° C. and constitutes about 25–45% by weight, the sweetener constitutes about 30–70% by weight, the protein constitutes about 0.5–6.0% by weight, and the emulsifier constitutes about 0.3–1.5% by weight, with each percent by weight calculated based on the total product weight on a dry basis.

6. A granita ice slurry product that contains the creamer of claim 5.

7. A creamer according to claim 1, in powder form, dried from a solution comprising about 40–75% solids by weight before drying.

8. A creamer according to claim 7, in agglomerated particulate form, with at least about 80% of the creamer particles having a particle size of about 170 microns or greater.

9. A creamer according to claim 7, which is able to withstand storage in powdered form at a temperature of 30° C. for at least five months.

10. A creamer according to claim 7, further comprising a coating of an emulsifier thereon.

11. A creamer according to claim 1 wherein the emulsifier is selected from the group consisting of monoglycerides, distilled monoglycerides, diglycerides, glycerol monostearates, sorbitol monostearates, esters or carbocyclic acids with mono- and di-glycerides, monosodium phosphate derivatives of mono- and di-glycerides, lecithin, diacetyl tartaric acid esters of mono-diglycerides, sorbitan esters, diacetyl tartaric acids esters of mono- and di-glycerides, succinylated mono- and di-glycerides, acetylated mono- and di-glycerides, hydroxylated lecithin, propylene glycol mono- and di-esters of fatty acids, polyglycerol esters of fatty acids, lactylic esters of fatty acids nonfat milk acids, and mixtures thereof.

12. A creamer according to claim 1 wherein the edible oil is a hydrogenated oil, an oil composed of a blend of triglycerides and vegetable oil, an oil with high levels of mono-unsaturates such that the fatty acid moieties in the tryglyceyide comprise at least about 70% by weight of oleic acid and less than about 20% by weight of linoleic acid, or mixtures thereof such that the melting point is less than 20° C.

13. A creamer according to claim 1, containing entrapped gas capable of causing foaming upon dissolution of the creamer in a beverage component.

14. An ice-slurry beverage that contains the creamer of claim 1.

15. A process for the preparation of a water-soluble creamer, the process comprising forming a solution of a sweetener, a water-dispersible or water-soluble protein, an emulsifier, and an edible oil having a melting point of below about 20° C., providing the components in relative proportions selected to render the creamer water-soluble and capable, after dispersion in a beverage component, of remaining in stable dispersion in a dynamic freeze/thaw equilibrium that includes multiple freeze-thaw cycles.

16. A cold-water soluble creamer for use in preparing an ice-slurry beverage product, the creamer comprising a sweetener, a water-dispersible or water-soluble protein, an emulsifier, and an edible oil having a melting point of below about 20° C., the components being in relative proportions selected to render the creamer capable, after dispersion in an ice-slurry beverage component, of remaining in stable dispersion in a dynamic freeze/thaw equilibrium that includes multiple freeze thaw cycles.

17. A creamer according to claim 16, in powder form, dried from a solution comprising 40–75 weight percent solids before drying, and able to withstand storage at a temperature of 30° C. for a period of at least 5 months.

18. A creamer according to claim 17, where the creamer is in a powdered form that is capable of substantially complete dispersal into an ice-slurry beverage at temperatures as cold as −3° C.

19. A creamer according to claim 16 in agglomerated particulate form, with at least about 80% of the creamer particles having a particle size of about 170 microns or greater.

20. A creamer according to claim 16 which contains entrapped gas capable of causing foaming upon dissolution of the creamer.

21. A creamer according to claim 16, where the edible oil has a melting temperature of below 20° C. and constitutes about 25–45% by weight, the sweetener constitutes about 30–70% by weight, the protein constitutes about 0.5–6.0% by weight, and the emulsifier constitutes about 0.3–1.5% by weight, with the percentage weights calculated on the total product weight on a dry basis.

22. A creamer according to claim 16 wherein the edible oil is selected from a hydrogenated oil, an oil composed of a blend of triglycerides and vegetable oil, an oil with high levels of mono-unsaturates such that the fatty acid moieties in the tryglyceride comprise at least about 70% by weight of oleic acid and less than about 20% by weight of linoleic acid, of a mixture thereof such that the melting point is less than 20° C.

23. A process for the preparation of a cold-water creamer, the process comprising providing, as components, a sweetener, a water-dispersible or water-soluble protein, an emulsifier, and an edible oil having a melting point below about 20° C., mixing the components together in relative proportions selected to render the creamer water-soluble and capable, after dispersion in a beverage component, of remaining in stable dispersion in a dynamic freeze/thaw equilibrium that includes multiple freeze/thaw cycles; and forming an aqueous solution containing the mixture.

24. The process according to claim 23, which further comprises drying the solution in order to form creamer particles.

25. The process according to claim 24, which further comprises agglomerating the powder to provide creamer particles, wherein at least about 80% of the particles have an average particle size of about 170 microns or greater.

* * * * *

UNITED STATES PATENT AND TRADEMARK OFFICE
CERTIFICATE OF CORRECTION

PATENT NO.    : 6,589,586 B2
DATED         : July 8, 2003
INVENTOR(S)   : Beeson et al.

It is certified that error appears in the above-identified patent and that said Letters Patent is hereby corrected as shown below:

<u>Title page,</u>
Item [63], Related U.S. Application Data, delete "Continuation" and insert -- Continuation-in-part --.

<u>Column 1,</u>
Line 5, delete "continuation" and insert -- continuation-in-part --.

<u>Column 9,</u>
Line 23, delete "tryglyceyide" and insert -- triglyceride --.

<u>Column 10,</u>
Line 27, delete "tryglyceride" and insert -- triglyceride --.

Signed and Sealed this

Fourteenth Day of October, 2003

JAMES E. ROGAN
*Director of the United States Patent and Trademark Office*